US009815680B2

(12) United States Patent
Tomesch et al.

(10) Patent No.: US 9,815,680 B2
(45) Date of Patent: Nov. 14, 2017

(54) WINE DISPENSER THAT PRESERVES WINE QUALITY BY REDUCING OXIDATION OF CONTAINED WINE WHEN THE DISPENSER IS PARTIALLY FULL

(71) Applicants: Harald George Tomesch, Bayside, WI (US); Markus Stefan Schneider, Karlsruhe (DE); Ralph Schmidt, Cambridge (CA)

(72) Inventors: Harald George Tomesch, Bayside, WI (US); Markus Stefan Schneider, Karlsruhe (DE); Ralph Schmidt, Cambridge (CA)

(*) Notice: Subject to any disclaimer, the term of this patent is extended or adjusted under 35 U.S.C. 154(b) by 111 days.

(21) Appl. No.: 14/882,429

(22) Filed: Oct. 13, 2015

(65) Prior Publication Data
US 2017/0101254 A1    Apr. 13, 2017

(51) Int. Cl.
*B67D 7/60* (2010.01)
*G01F 11/00* (2006.01)
(Continued)

(52) U.S. Cl.
CPC ......... *B67D 3/007* (2013.01); *B65D 47/2006* (2013.01); *B65D 47/2031* (2013.01);
(Continued)

(58) Field of Classification Search
CPC .............. B65D 83/0033; B65D 47/263; B65D 83/0011; B67D 3/007
(Continued)

(56) References Cited

U.S. PATENT DOCUMENTS

| 2,106,470 A | * | 1/1938 | Shonnard | ................ F16N 15/00 |
| | | | | 222/213 |
| 4,162,749 A | | 7/1979 | Bennett | |
| | | | (Continued) | |

FOREIGN PATENT DOCUMENTS

CN    202968087 U    6/2013

OTHER PUBLICATIONS

Web Link: http://www.sunsky-online.com/product/defaultlview.do?subject.id=240431 Downloaded May 14, 2015 Wine Bar Butler—Single Optic 25ML Rotary 1 Shot Alcohol Dispenser This 25ml spirit measure can be fitted to the wall or onto a shelf, has a spring-loaded receptacle that holds bottles of various sizes up to 1 liter, and prevents wastage or spillages.

(Continued)

*Primary Examiner* — Jeremy W Carroll
(74) *Attorney, Agent, or Firm* — Russ Weinzimmer & Associates, PC

(57) ABSTRACT

A wine dispenser is disclosed that preserves wine by reducing oxidation when partially filled with wine. The dispenser includes: a bottle body having a uniform cross section; a piston disposed within the bottle body for pushing the wine therethrough; a drive member capable of pushing the piston along the bottle body; and a dispensing assembly attached to the dispensing end. The dispensing assembly includes: a shoulder having a wine flow channel, the wine being able to flow out only via the wine flow channel; a neck in sealable and rotatable relationship with the shoulder, the neck having a pouring end and a flow regulation end, the flow regulation end having at least one opening that can be rotated so as to permit wine to flow in from the wine flow channel, through the at least one opening, and out through the pouring end, when pressure is applied to the piston.

14 Claims, 18 Drawing Sheets

(51) Int. Cl.
B67D 3/00 (2006.01)
B65D 47/20 (2006.01)
B65D 83/00 (2006.01)
G01F 17/00 (2006.01)
G01K 11/12 (2006.01)
B65D 47/26 (2006.01)
B65D 85/72 (2006.01)

(52) U.S. Cl.
CPC ....... B65D 47/263 (2013.01); B65D 83/0005 (2013.01); B65D 83/0011 (2013.01); B65D 83/0033 (2013.01); B65D 85/72 (2013.01); B67D 3/0051 (2013.01); G01F 17/00 (2013.01); G01K 11/12 (2013.01)

(58) Field of Classification Search
USPC ................ 222/390, 490, 553, 331, 523, 520
See application file for complete search history.

(56) References Cited

U.S. PATENT DOCUMENTS

| | | | |
|---|---|---|---|
| 4,807,785 A | 2/1989 | Pritchett | |
| 4,982,879 A | 1/1991 | Corrado et al. | |
| 5,097,991 A | 3/1992 | Lance | |
| 6,105,803 A * | 8/2000 | Standish | B65D 11/04 215/900 |
| 8,365,931 B2 | 2/2013 | Rees et al. | |
| 8,746,502 B2 | 6/2014 | Lambrecht | |
| 8,919,610 B2 | 12/2014 | Haley et al. | |
| 2002/0088827 A1* | 7/2002 | Colucci | B65D 81/245 222/386 |
| 2002/0096540 A1* | 7/2002 | Gross | B67D 3/0029 222/185.1 |
| 2002/0158090 A1* | 10/2002 | Odessa | B05B 11/062 222/631 |
| 2004/0206782 A1* | 10/2004 | Salamini | B05B 11/0048 222/383.1 |
| 2009/0052971 A1* | 2/2009 | Pires | A45D 34/04 401/172 |
| 2009/0071986 A1* | 3/2009 | Wang | G01F 11/026 222/333 |
| 2015/0259186 A1* | 9/2015 | Haley | B67C 3/16 53/432 |
| 2016/0178455 A1* | 6/2016 | Astorino | G01K 11/165 374/162 |

OTHER PUBLICATIONS

Web Link: http://www.wineenthusiast.com/krups-wine-dispenser. asp Downloaded May 14, 2015 KRUPS Wine Dispenser A mechanical pump inside the machine dispenses and preserves (delays wine oxidation by vacuuming) the wine, Wine is preserved 5-7 days for white wine and 7-10 days for red wine.

Web Link: http://www.coravin.com/coravin-systems/coravin-1000-wine-access-system.html Downloaded May 14, 2015 CORAVIN™ 1000Wine Access System Its innovative design keeps your wine safe from oxidation, allowing it to continue to age naturally, giving you the freedom to pour a glass from any bottle at any time.

Web Link: http://global.rakuten.com/en/store/wish-co/item/vinaera-mv6/ Downloaded May 14, 2015 Vinaera Electronic Wine Aerator Prevents unwanted oxidation, keep delicious wine.

* cited by examiner

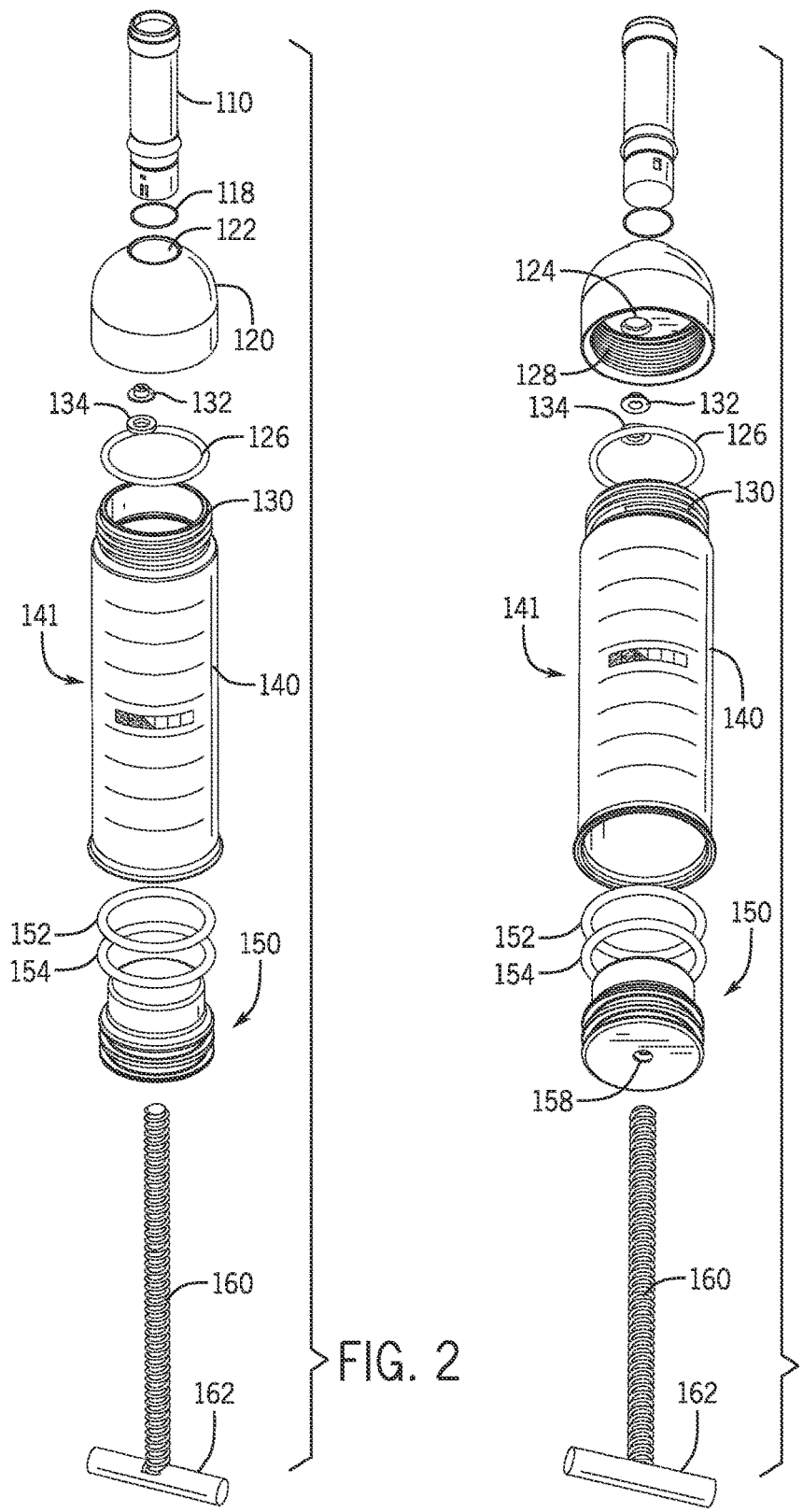

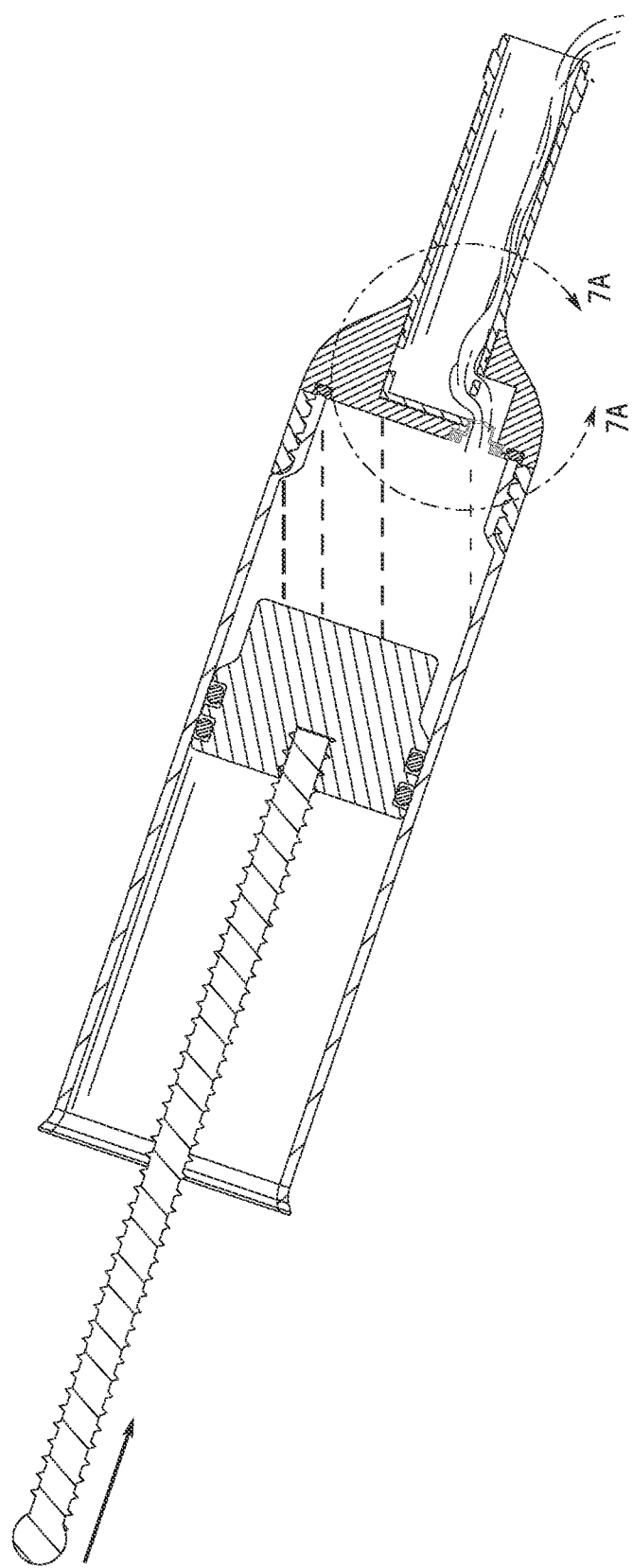

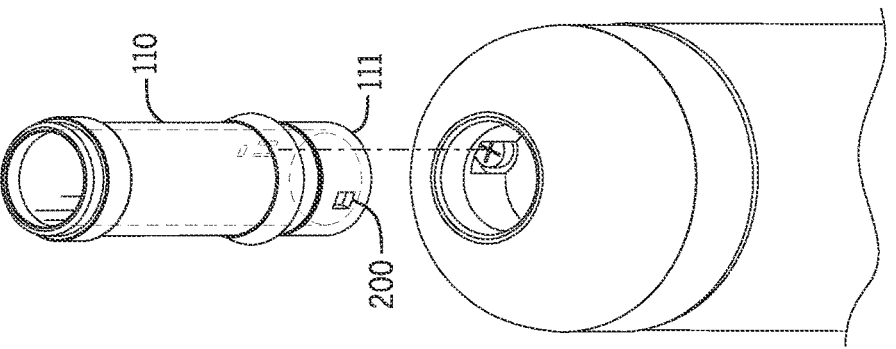
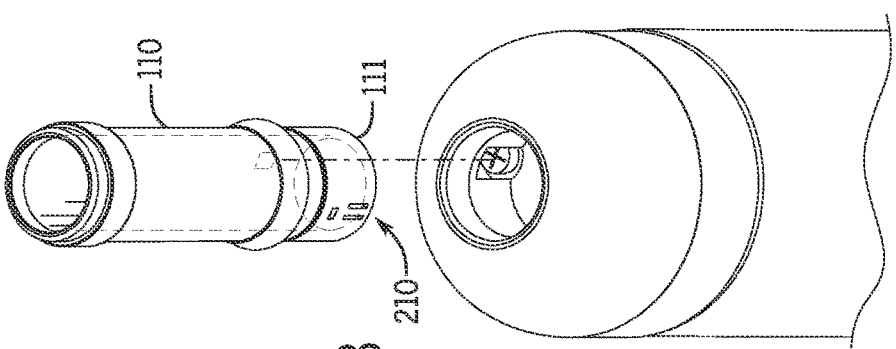
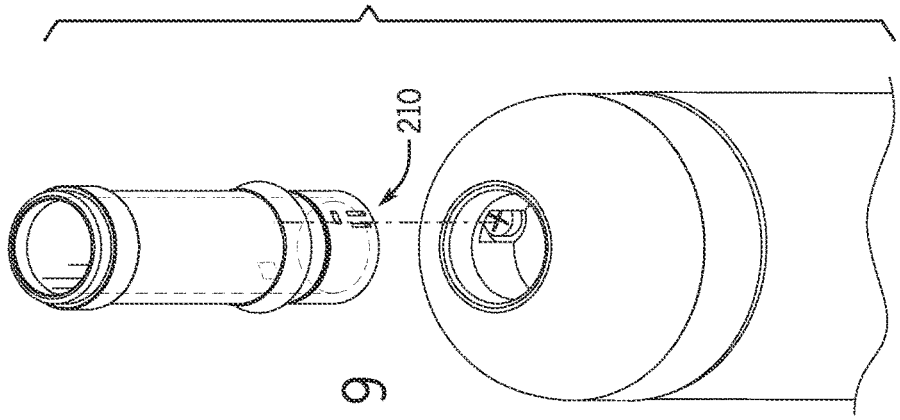

WINE DISPENSER THAT PRESERVES WINE QUALITY BY REDUCING OXIDATION OF CONTAINED WINE WHEN THE DISPENSER IS PARTIALLY FULL

FIELD OF THE INVENTION

The present invention relates generally to the handling of wine, and more particularly to wine dispensers.

BACKGROUND OF THE INVENTION

Wine is a delicate beverage that must be handled properly to preserve its quality. For centuries, wine has been enjoyed in bottled form, normally sealed with an airtight cork. Once opened, the characteristics of the wine in the bottle begin to change. Almost immediately, the wine begins to oxidize rapidly, degrading the taste and other noticeable qualities of the wine. Since most wines begin to oxidize within minutes of being opened, and many wines are discarded due to the degree of oxidization at the end of each business day, most all wines after two day or three days. Wine servers strive to be vigilant to monitor open bottle dates and discard the wines they serve when quality falls below an acceptable level; restaurants similarly expense wine offerings based on the first perhaps only glass of wine sold from a bottle. Restaurants thus often limit the number of wines they have available for sale by the glass, and they limit the number of expensive wines sold by the glass because of the rapid oxidization of wine once the bottle is opened.

There are a number of known arrangements that seek to preserve wine in an opened bottle which include placing a temporary stopper or seal in the bottle, and evacuating the air from the bottle above the remaining wine. However, these arrangements remove smell (or "nose") characteristics from the wine during air evacuation. Further, every wine has gas naturally stored within its composition and the vacuum actually draws out those gasses, thereby further affecting the taste and quality of the wine. Other arrangements include placing an inert gas such as nitrogen or argon into the bottle to displace the air. These systems can be used alone or also with a temporary stopper or seal. However, the natural gas composition of the wine is nevertheless affected by adding pressure to the wine, ultimately changing its composition. The relative expense of the argon/nitrogen system, along with the ongoing expense of purchasing additional food-grade argon and nitrogen cartridges, prevents most winery operations or restaurants from purchasing an argon/nitrogen system for each wine it serves or tastes.

Furthermore, wineries and restaurants rarely use such systems effectively during the day for sales by the glass or for wine tastings, but largely utilize these arrangements at closing time. The result is such that wines by the glass do not present themselves well to the consumer, since the quality of the wine in the partially filled bottle rapidly decays.

SUMMARY OF THE INVENTION

The present invention provides a simple and inexpensive dispenser for wine that can be used immediately after a standard bottle of wine is opened so that contact between the wine and oxygen is significantly reduced and the wine may be preserved for use by a wine server such as a winery, bar or restaurant, or the consumer. The exposure to oxygen and any resulting degradation in the wine is limited to the time it takes to pour the bottle of wine into the device, which is equal to the exposure to air when the wine was bottled by the wine producer.

The present invention presents a piston in the dispensing device that presses wine stored therein toward a diaphragm and valve at the neck of the dispensing device until all gas or oxygen is removed from the device. The piston remains in this static position until the server dispenses wine, at which time the piston is pushed upward toward the neck of the dispensing device to displace a desired volume of wine. The wine does not flow unless the neck of the dispenser is turned to open to allow the wine to flow. The dispensing device of the present invention is constructed from food grade glass, stainless steel, or plastic and is graduated by volume in some embodiments. In other embodiments, temperature sensitive strips embedded in the wall of the dispenser allows for optimum serving conditions by indicating temperature.

A general aspect of the invention is a wine dispenser that protects wine quality by reducing oxidation of wine when the dispenser is partially full. The wine dispenser includes: a bottle body capable of containing wine, the bottle body having a piston-receiving end and a wine dispensing end, the bottle body having a uniform cross section between the piston-receiving end and the wine dispensing end; a piston disposed within the piston-receiving end of the bottle body, the piston being capable of pushing the wine toward the wine dispensing end of the bottle body; a drive member cooperative with the piston, the drive member being capable of pushing the piston along the bottle body; and a dispensing assembly attached to the dispensing end of the bottle body, the dispensing assembly including: a shoulder sealed to the dispensing end of the bottle body, the shoulder having a wine flow channel therethrough, the wine being able to flow out from the bottle body only via the wine flow channel; a neck cooperative with the shoulder, the neck being in sealable and rotatable relationship with the shoulder, the neck having a pouring end and a flow regulation end, the flow regulation end having at least one opening that can be rotated so as to permit wine to flow in from the wine flow channel, through the at least one opening, and out through the pouring end of the neck, when pressure is applied to the piston via the drive member.

In some embodiments, the flow regulation end of the neck includes an aerated pour opening, and a non-aerated pour opening.

In some embodiments, the flow regulation end of the neck can be rotated so as to prevent flow of wine from the dispenser.

In some embodiments, the uniform cross section between the piston-receiving end and the wine dispensing end is one of: a circular shape, or an oval shape, or a rounded square shape.

In some embodiments, the drive member is one of: a push rod, or a telescoping rod, or a pump. In further embodiments, the pump uses air between the piston and the pump to drive the piston forward.

In some embodiments, the drive member includes a handle and a threaded shaft, the threaded shaft being attached to a threaded hole in the piston.

In some embodiments, the piston includes first and second O-rings, the O-rings providing a seal between the bottle body and the piston.

In some embodiments, the bottle body includes fill marks indicating volumes of wine stored therein.

In some embodiments, the bottle body includes a temperature strip indicating surface temperature of the bottle body.

In some embodiments, the channel in the shoulder further includes: a valve that is air-tight when pressure is the same on both sides, the valve also allowing wine to flow therethrough when under pressure from wine pushed towards it by the piston.

In some embodiments, the neck can be rotated so as to align the at least one opening with the valve so as to permit wine to flow through the wine flow channel, through the valve, through the at least one opening, and out through the pouring end of the neck so as to dispense the wine. In further embodiments, the valve is a diaphragm having at least one cut. In other further embodiments, the valve is a diaphragm having a pair of perpendicular cuts.

In some embodiments, the drive member includes: at least one drive puck cooperative with the piston, the at least one drive puck providing a surface against which force may be applied so as to drive the piston along the bottle body. In further embodiments, the drive member further includes: at least one additional drive puck that can cooperate with the at least one drive puck so as to form a plurality of interlocking drive pucks.

The device allows selection between a straight pour or an aerated pour of the wine depending on the desires of the consumer. The device can be made to contain various amounts of wine, such as 375 ml, 500 ml, 750 ml or 1000-2000 ml, depending on the original bottle being served. The dispenser is reusable, washable in high temperature dishwashers, and both the piston and the wine dispenser can be branded using labels, etching, printing, lighting, or other branding methods. The lip of the neck can be thin to prevent dripping when the dispenser is in an upright position. The dispenser rests on its bottom in a similar fashion as a wine bottle, and can be refrigerated.

In yet another aspect, the invention allows the server to accurately dispense wines using an accurate scale depending on the needs of the winery, restaurant, or consumer. Many wineries over-pour their samples, or restaurants may not offer a consistent pour to their patrons. The piston of the dispenser can be pressed through the graduated body of the dispenser with additional volumetric pucks being added to the open bottom of the body, or with a press rod that inserts into the piston to the proper volumetric amount so as to press more wine through the dispenser in exact quantity offerings when wine is poured.

BRIEF DESCRIPTION OF THE DRAWINGS

Many additional features and advantages will become apparent to those skilled in the art upon reading the following description, when considered in conjunction with the accompanying drawings, wherein:

FIG. 2 shows an exploded view of the dispensing device of FIG. 1 as viewed from slightly above.

FIG. 3 shows an exploded view of the dispensing device of FIG. 1 as viewed from slightly below.

FIG. 7 is a cutaway side view of the dispensing device of FIG. 1 showing an open valve and wine flowing out via the bottle neck.

FIG. 8 shows a perspective view of a dispensing bottle neck with an aeration opening aligned with the valve so as to allow aerated pouring wine via the bottle neck.

FIG. 9 shows a perspective view of a dispensing bottle neck with a single opening oriented in alignment with the valve so as to allow rapid pouring wine via the bottle neck.

FIG. 10 shows a perspective view of the dispensing bottle neck of FIG. 9 oriented with neither the aeration opening or the regular opening in alignment with the valve so as to prevent pouring wine via the bottle neck.

DETAILED DESCRIPTION

Figure 1:
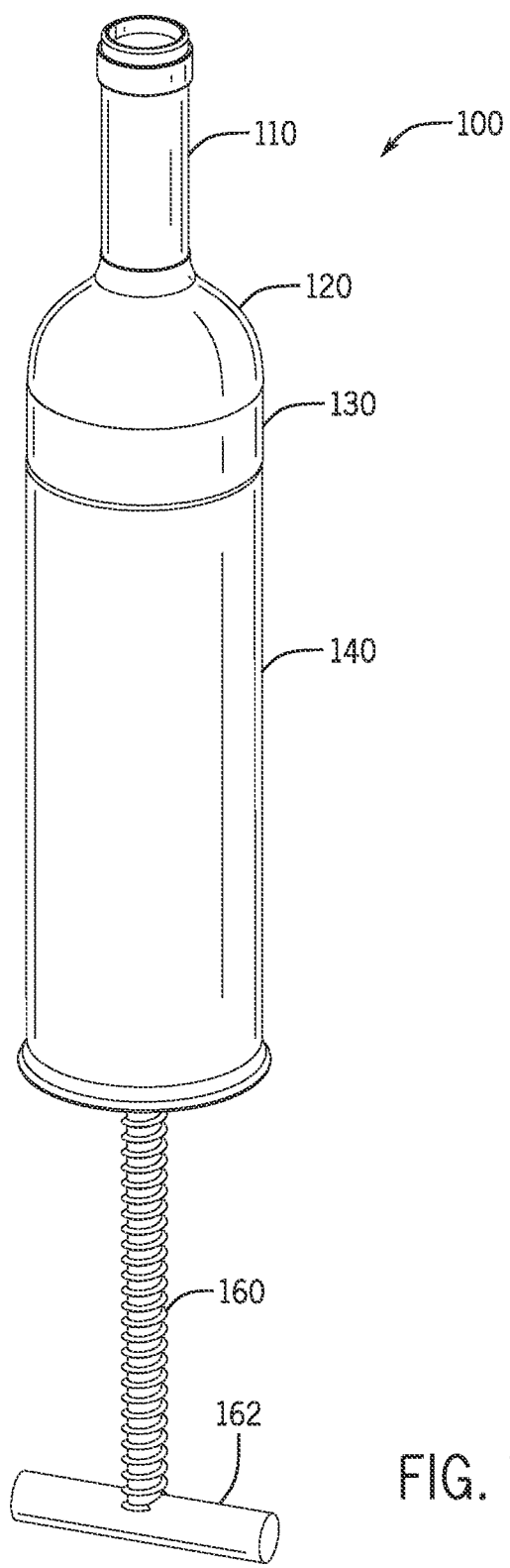
FIG. 1 shows a perspective view from above the dispensing device having an embodiment of a drive member.

Attention is now direct to FIG. 1, which shows a perspective view of dispensing device 100. Dispensing device 100, as shown, includes twistable bottle neck 110 located at the top of dispensing device 100, which has an appearance similar to traditional wine bottles. Bottle neck 110 is sealably and rotatably attached at its bottom to bottle shoulder 120. In an embodiment, bottle shoulder 120 connects by threaded interface 130 to bottle body 140, which contains the wine to be dispensed when threaded shaft 160 is gripped by handle 162 and pushed upward toward bottle shoulder 120.

FIGS. 2 and 3 show exploded views of dispensing device 100 from different perspectives. As shown, twistable bottle neck 110 is secured by O-ring 118 when bottle neck 110 is inserted into aperture 122 of bottle shoulder 120. O-ring 126 fits on the upper surface of threaded interface 130 when bottle shoulder 120 is secured by matching threaded interface 128 (FIG. 3) and threaded interface 130 to secure bottle shoulder 120 to bottle body 140. Diaphragm 132 and securing washer 134 insert into aperture 124 (FIG. 3). In an embodiment, bottle body 140 is a cylindrical piece with a hollow body in which wine or other dispensed liquid is stored. In various embodiments, bottle body 140 is made from glass, plastic, stainless steel, or other suitable material. In some embodiments, bottle body 140 includes a plurality of fill lines 141 displayed to indicate different volumes of wine contained therein, similar to markings on a measuring cup. Also, in some embodiments, temperature strip 143 is affixed to bottle body 140 and provides an indication of the surface temperature of bottle body 140.

Piston 150 includes O-rings 152 and 154 to provide a seal against the inner surface of bottle body 140 to prevent wine or other dispensing liquid from leaking out of the bottom of bottle body 140, and to prevent air from being drawn into bottle body 140 during use. When piston 150 is driven upward by threaded shaft 160, wine or other dispensing liquid is propelled upward and out of bottle shoulder 120 and through bottle neck 110. As shown in FIG. 3, threaded shaft 160 is connected to the bottom of piston 150 by inserting into aperture 158. In some embodiments, threaded shaft 160 has a decorative, threaded appearance that suggests to a user to twist handle 162 while pushing threaded shaft 160 upward into bottle body 140. While piston 150 is shown as having threaded shaft 160 as its drive member, it is to be understood that sufficient force may be exerted by a user pressing his or her fingers directly against the bottom surface of piston 150 and pressing it upward.

Figure 4:
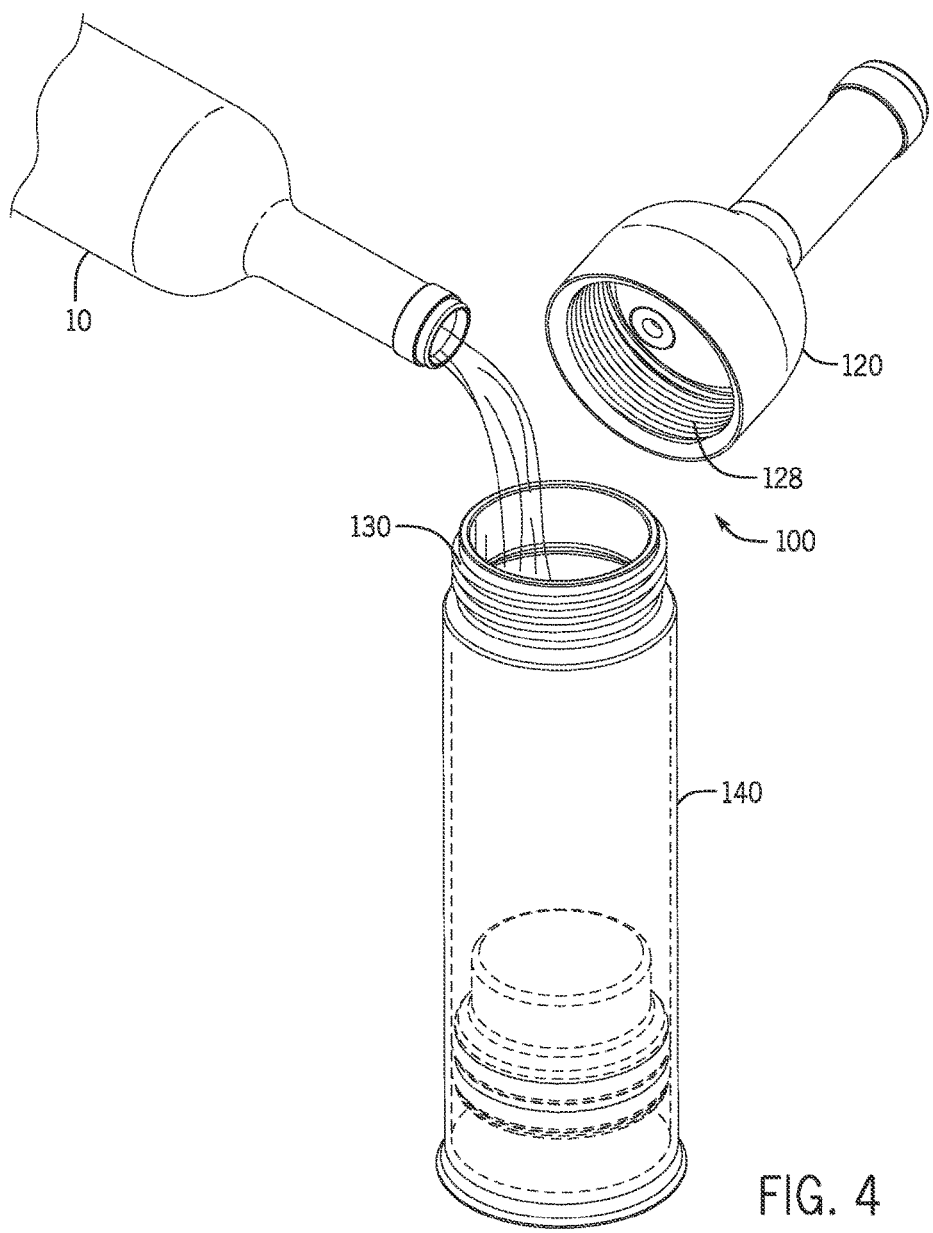
FIG. 4 shows opening the dispensing device of FIG. 1 for the purpose of filling the dispenser with a quantity of wine.

FIG. 4 shows opening and filling of the dispensing device of FIG. 1. When threaded interfaces 128 and 130 are unscrewed from each other, and piston 150 is secured in the bottom of bottle body 140, wine from bottle 10 is poured into bottle body 140. After the desired amount is poured into bottle body 140, threaded interfaces 128 and 130 are screwed back together.

Figure 5:
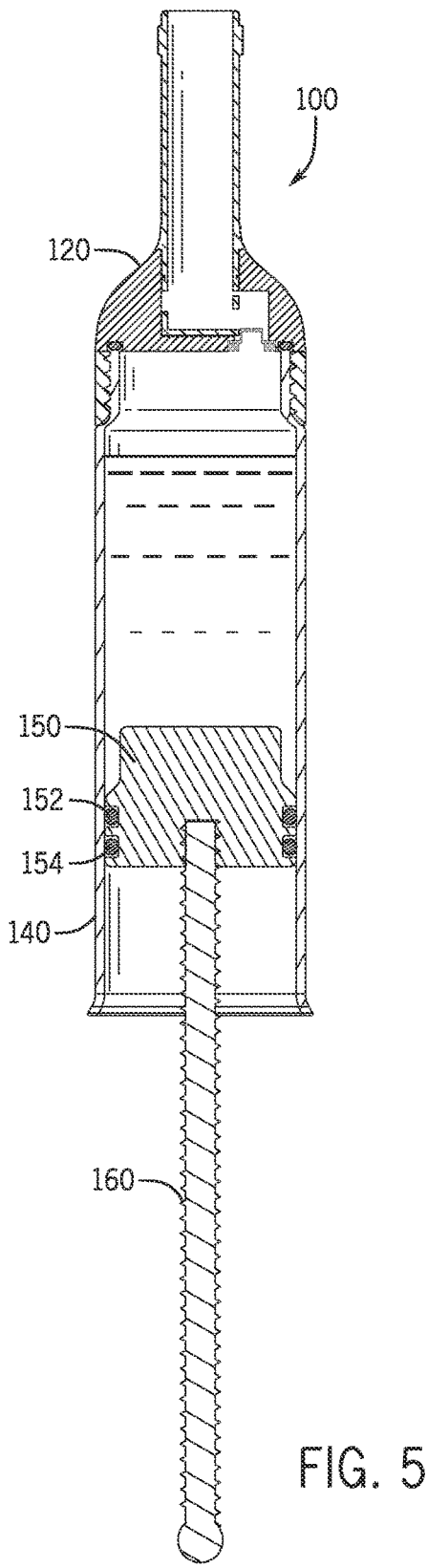
FIG. 5 is a cutaway side view of the dispensing device of FIG. 1 in a position before dispensing wine.

FIG. 5 shows a cutaway side view of the dispensing device of FIG. 1 in a position before dispensing wine. As shown, piston 150 is located near the bottom of bottle body 140, and O-rings 152 and 154 provide the seal described above to the inner surface of bottle body 140. In an embodiment, O-rings 152 are encapsulated with either fluorinated ethylene propylene (FEP), perfluoroalkoxy (PFA) or other suitable material to minimize friction between O-rings 152 and 154 and the inner surface of bottle body 140.

Figure 6:
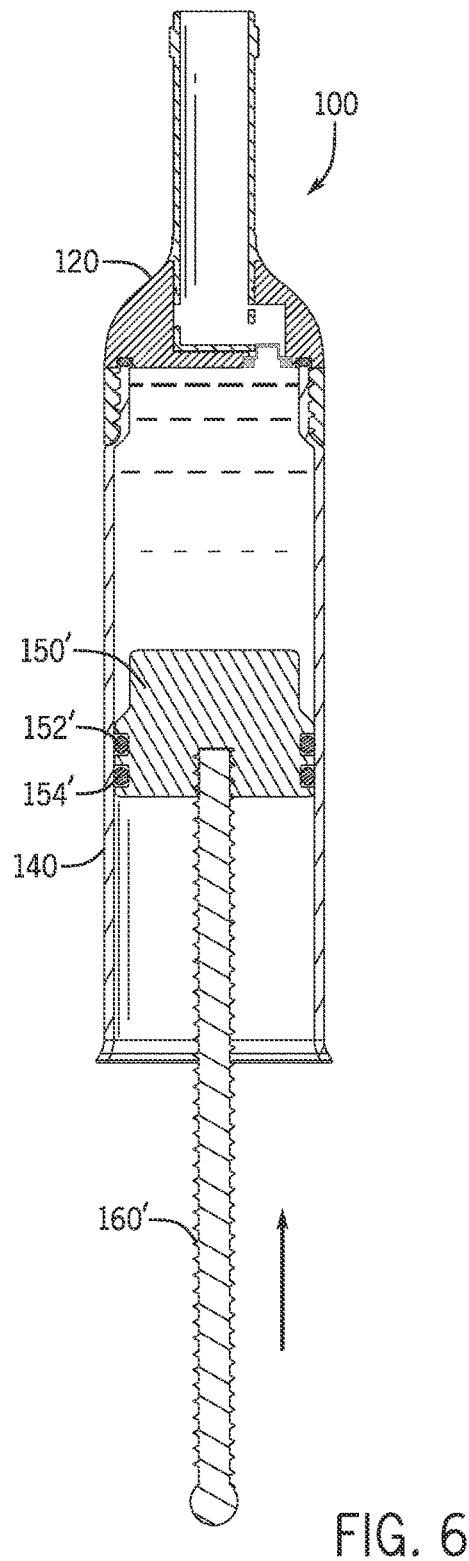
FIG. 6 is a cutaway side view of the dispensing device of FIG. 1 in a position after dispensing wine by moving the piston via the drive member.

FIG. 6 is a cutaway side view of the dispensing device of FIG. 1 in a position after dispensing wine. As shown, piston 150 is driven upward by threaded shaft 160, thereby decreasing the volume of wine stored in bottle body 140 by driving some of it out through bottle shoulder 120.

FIG. 7 is a cutaway side view of the dispensing device of FIG. 1 showing an open valve and wine flowing from the dispenser.

Figure 7A:
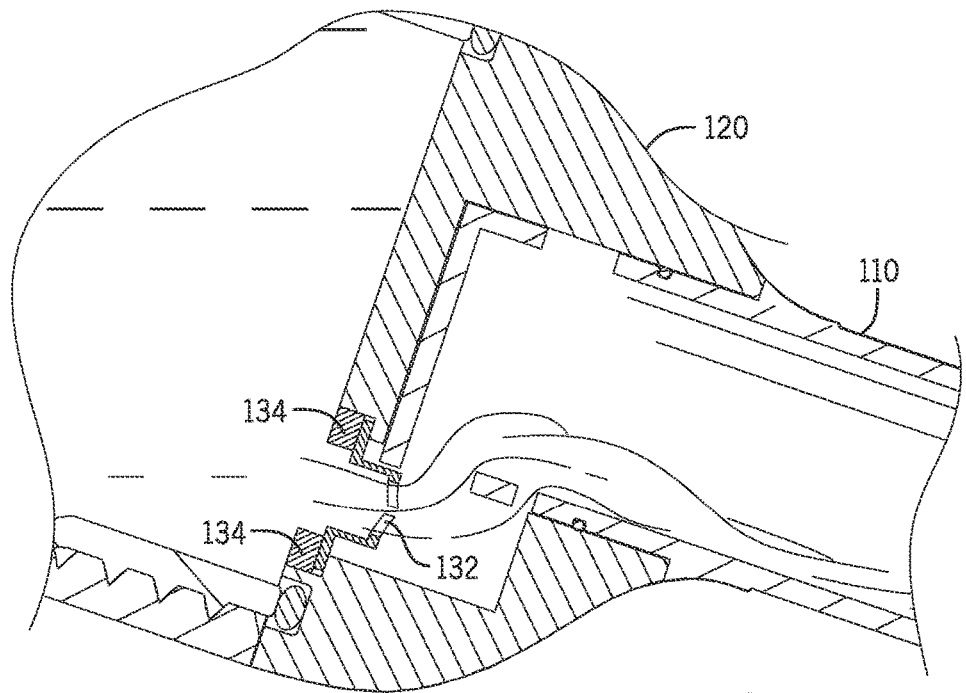
FIG. 7A is a cutaway side view of the dispensing device of FIG. 1 showing an open valve in detail.
Figure 7B:
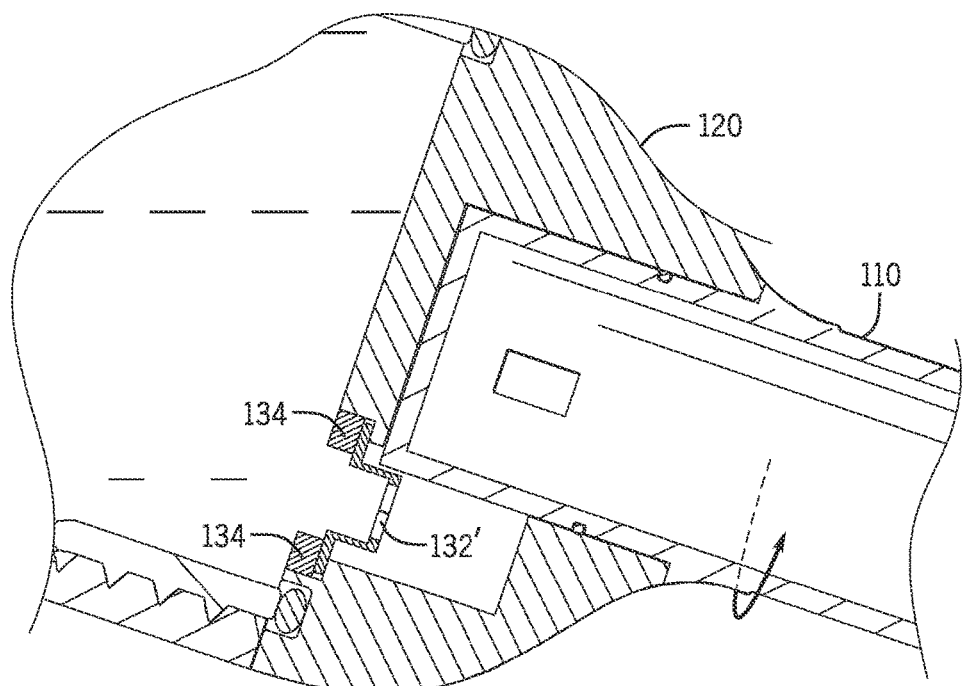
FIG. 7B is a cutaway side view of the dispensing device of FIG. 1 showing the valve of FIG. 7A in a closed condition.

Referring to FIG. 7A, wine flows through an opening in diaphragm 132 placed in bottle shoulder 120 and retained by retaining washer 134. Diaphragm 132 is made of sufficiently flexible material, such as plastic, that it opens when sufficient pressure is exerted on diaphragm 132 that occurs when threaded shaft 160 is pushed upward into bottle body 140 while bottle neck 110 is twisted into a "pour" position. When pressure is no longer exerted against piston 150, as shown in FIG. 7B, diaphragm 132 returns to its closed position, and an air-tight seal is restored to bottle body 140.

FIG. 8-10 show perspective, exploded views of multiple positions of bottle neck 110 aligned with bottle shoulder 120 to align valve 132 with a dispensing opening formed in the neck 110. As shown in FIG. 8, opening 200, in some embodiments, is a single aperture, positioned near the lower circumferential edge 111 of bottle neck 110. However, as shown in FIG. 9, the opening 200 and an aeration opening 210 are also formed near lower circumferential edge 111, and in some embodiments are formed at approximately 180 degrees from each other with respect to lower circumferential edge 111. In some embodiments, both opening 200 and aeration opening 220 are provided to allow selection of either a faster pour or an aerated pour, depending on preference. Also, an air vent is formed by one of either opening 200 or aeration opening 210, for smoother pouring through the bottle neck 110.

FIG. 10 shows a perspective view of the dispensing bottle neck of FIG. 9 oriented with valve 132 blocked by the neck 110 as neither opening 200 nor aeration opening 202 aligns with the valve 132.

Figure 11A:
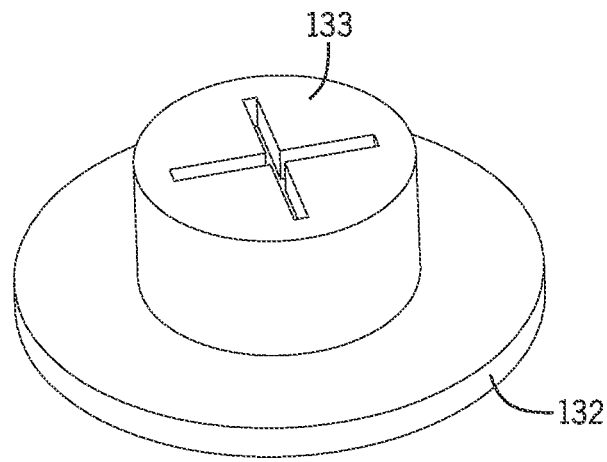
FIG. 11A shows a perspective view of the valve of FIGS. 8-10 as viewed from above.

FIG. 11A shows a perspective view of the valve 132 as viewed from above. Top surface 133 has pair of perpendicular cuts forming a pattern in the shape of a plus sign ("+").

Figure 11B:
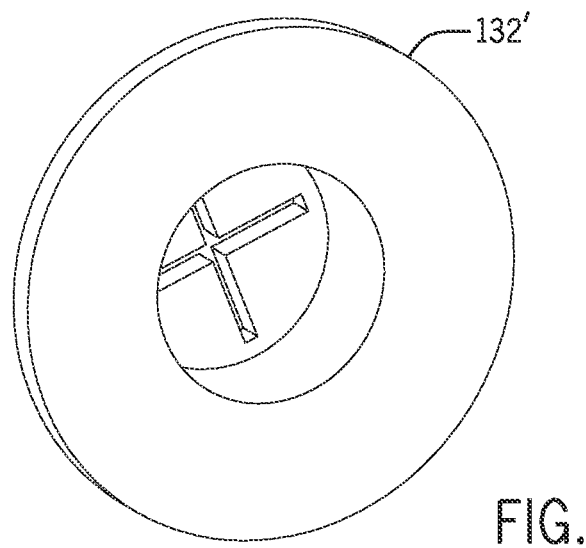
FIG. 11B shows a perspective view of the valve of FIGS. 8-10 as viewed from below.

FIG. 11B shows the bottom perspective view of valve 132. It is important to note that while a void is shown in top surface 133 along the plus-sign-shaped cut, it is to be understood that this void is simply for the viewer's understanding, and in actual production, the material surrounding the plus sign in FIGS. 11A and 11B still forms an air-tight seal when pressure is not exerted against threaded shaft 160.

Figure 12A:
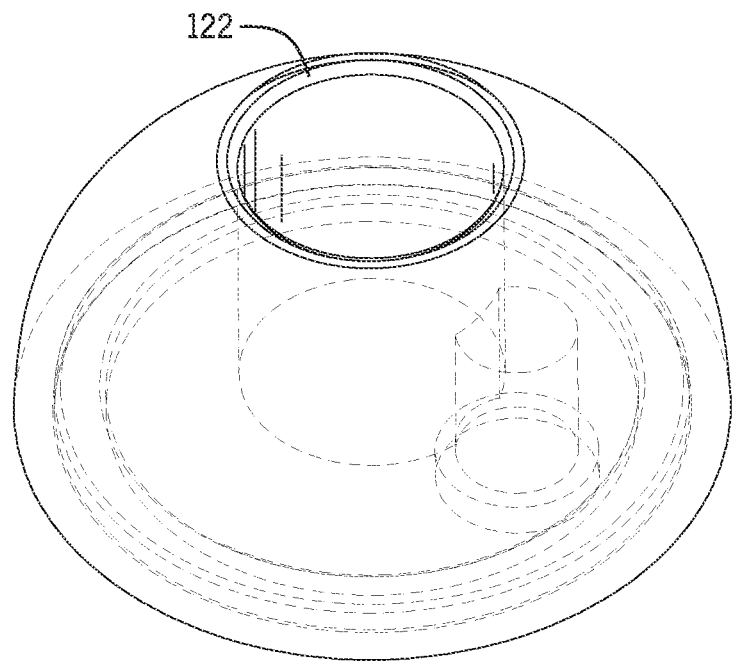
FIG. 12A shows a shoulder of the dispensing device of FIG. 1 that threads onto a container in a perspective view with dashed lines showing a valve body in the interior of the shoulder.
Figure 12B:
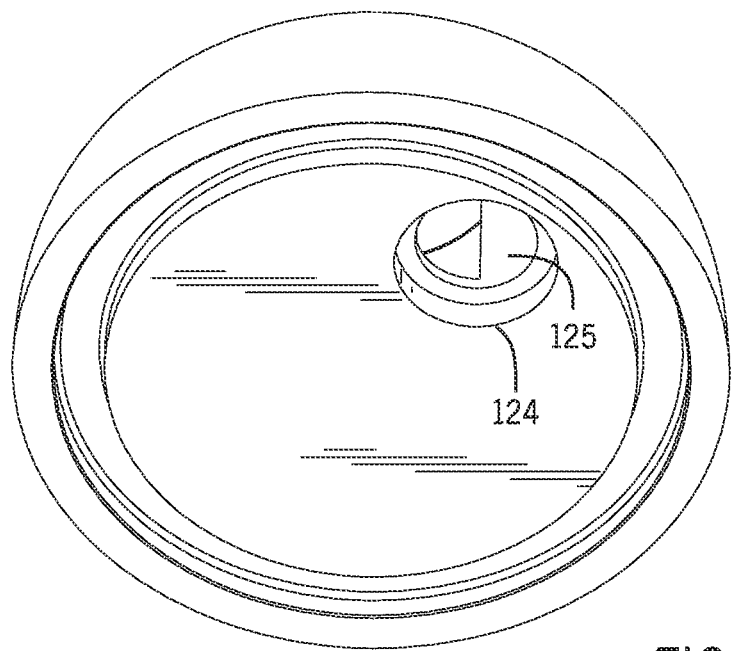
FIG. 12B shows the shoulder shown in FIG. 12A in a perspective view as viewed from below.

FIG. 12A shows bottle shoulder 120 with aperture 122. As shown, bottle neck 110 is removed from bottle shoulder 120. Turning over bottle shoulder 120 provides the view of FIG. 12B, where valve body 125 is shown formed within aperture 124. Valve body 125 is shown for clarity without valve 132 placed therein, as it is normally configured during use with bottle neck 110 as shown in FIGS. 8-10 and described above.

Figure 13:
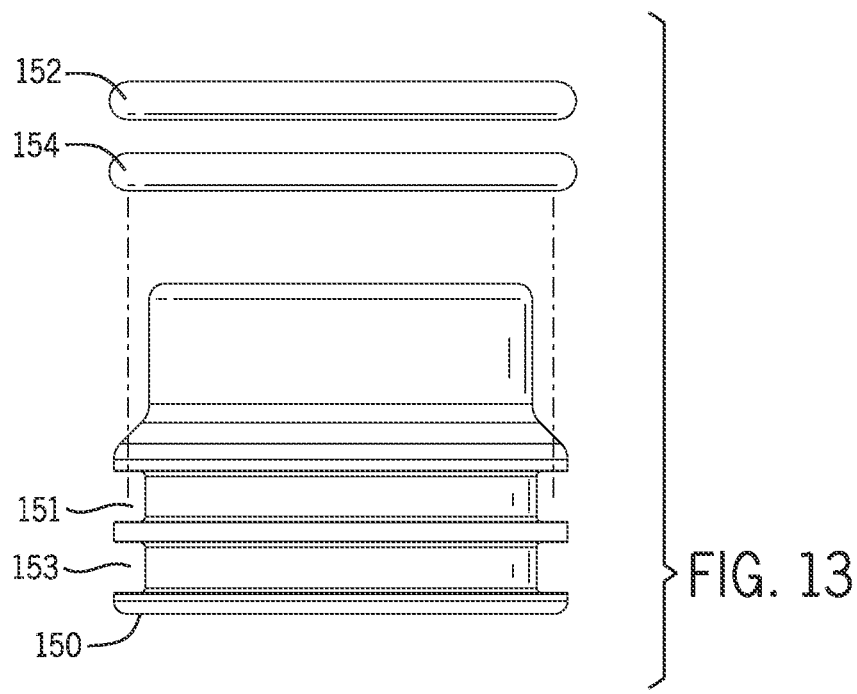
FIG. 13 shows a side view of a piston that is sealed by a pair of O-rings against the interior surface of the bottle body.

FIG. 13 shows a side, exploded view of a piston 150. As described above, piston 150 maintains a seal against the inner surface of bottle body 140 through the use of O-rings 152 and 154. O-ring 152 fits in channel 151, and O-ring 154 fits in channel 153.

Figure 14:
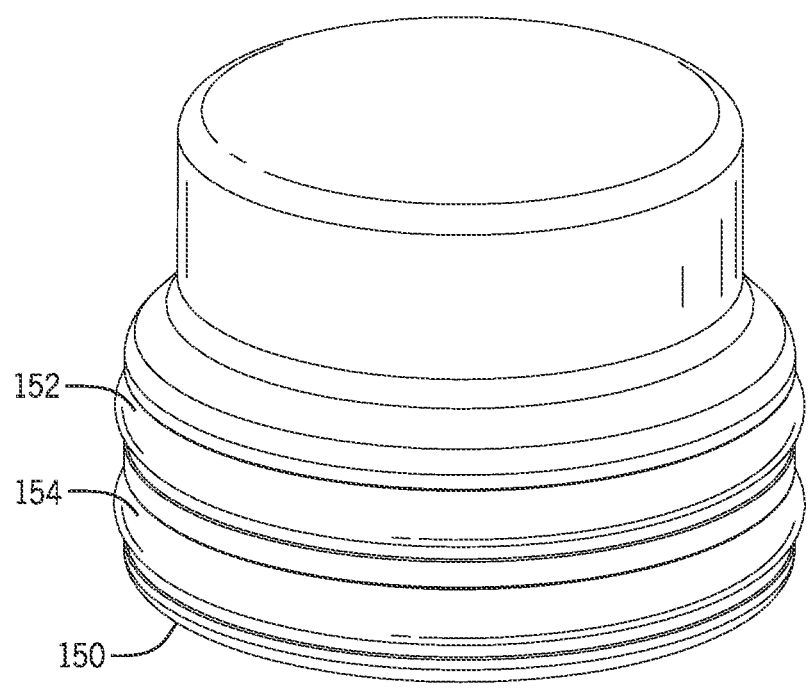
FIG. 14 shows a perspective view of the piston with O-rings placed in channels about its periphery.

FIG. 14 shows a perspective view of piston 150 with O-rings 152 and 154 placed in channels 151 and 153, respectively.

Figure 15:
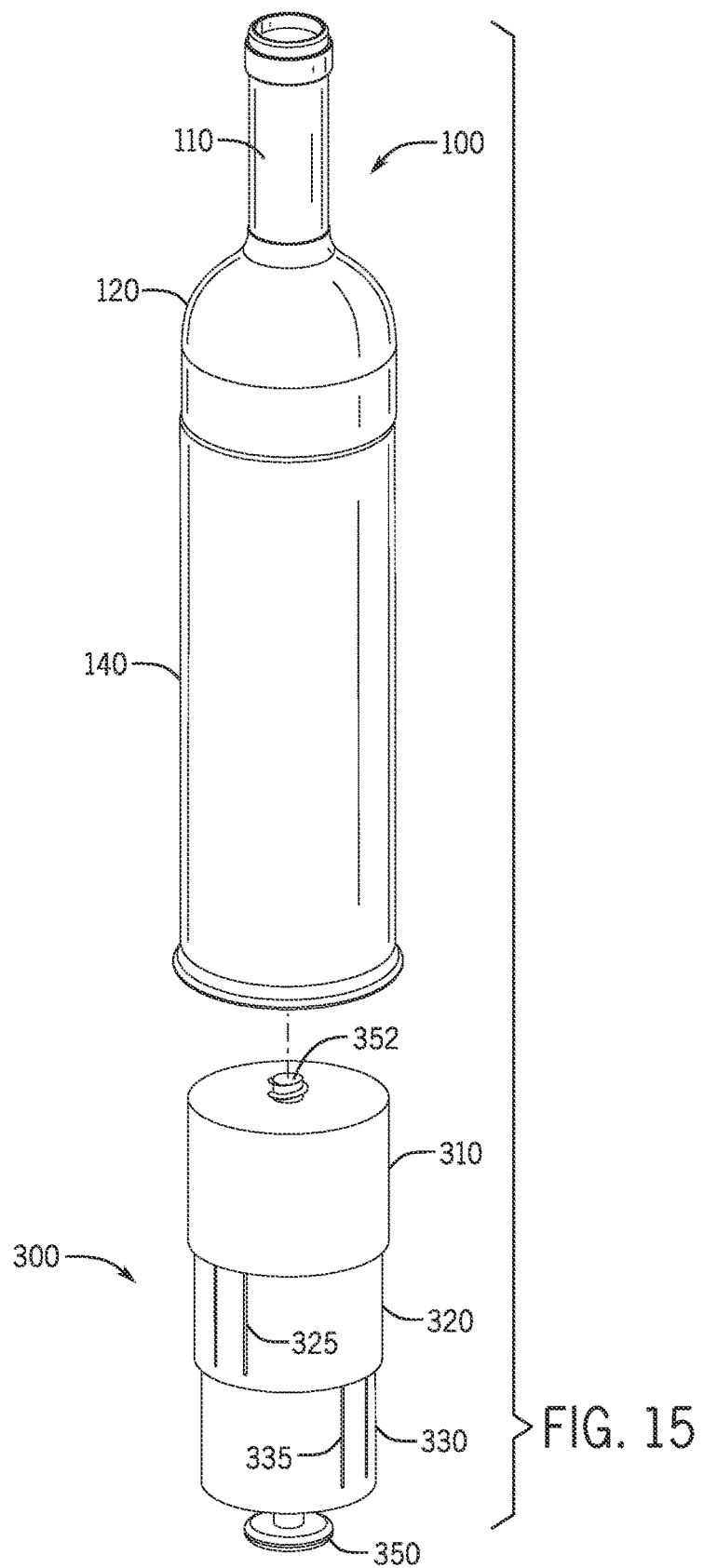
FIG. 15 shows an alternative embodiment of the dispensing device of FIG. 1, with a plurality of nesting drive pucks placed beneath the piston of the dispensing device.

FIG. 15 shows an alternative embodiment of the dispensing device of FIG. 1, with a plurality of nesting drive pucks 300 placed beneath piston 150 (not visible) and bottle body 140 of dispensing device 100. Nesting drive pucks 300 replace threaded shaft 160 in an alternative embodiment, and provide a configuration that allows dispensing device 100 to sit upright, such as a wine bottle might sit on a shelf. Nesting drive pucks 300 are shown as having three separate pieces 310, 320, 330, sufficiently dimensioned so that piece 330 fits inside piece 320, and piece 320 fits inside piece 310. In this manner, all three pieces may rest below piston 150 when dispensing device 100 is stored upright with a full bottle body 140. Also shown are locking tabs 325 on piece 320, and locking tabs 335 on piece 330. Below piece 330 is puck 350, which allows a user to press the nesting drive pucks 300 against the bottom of piston 150 in a similar manner as push rod 160 described above.

Figure 16:
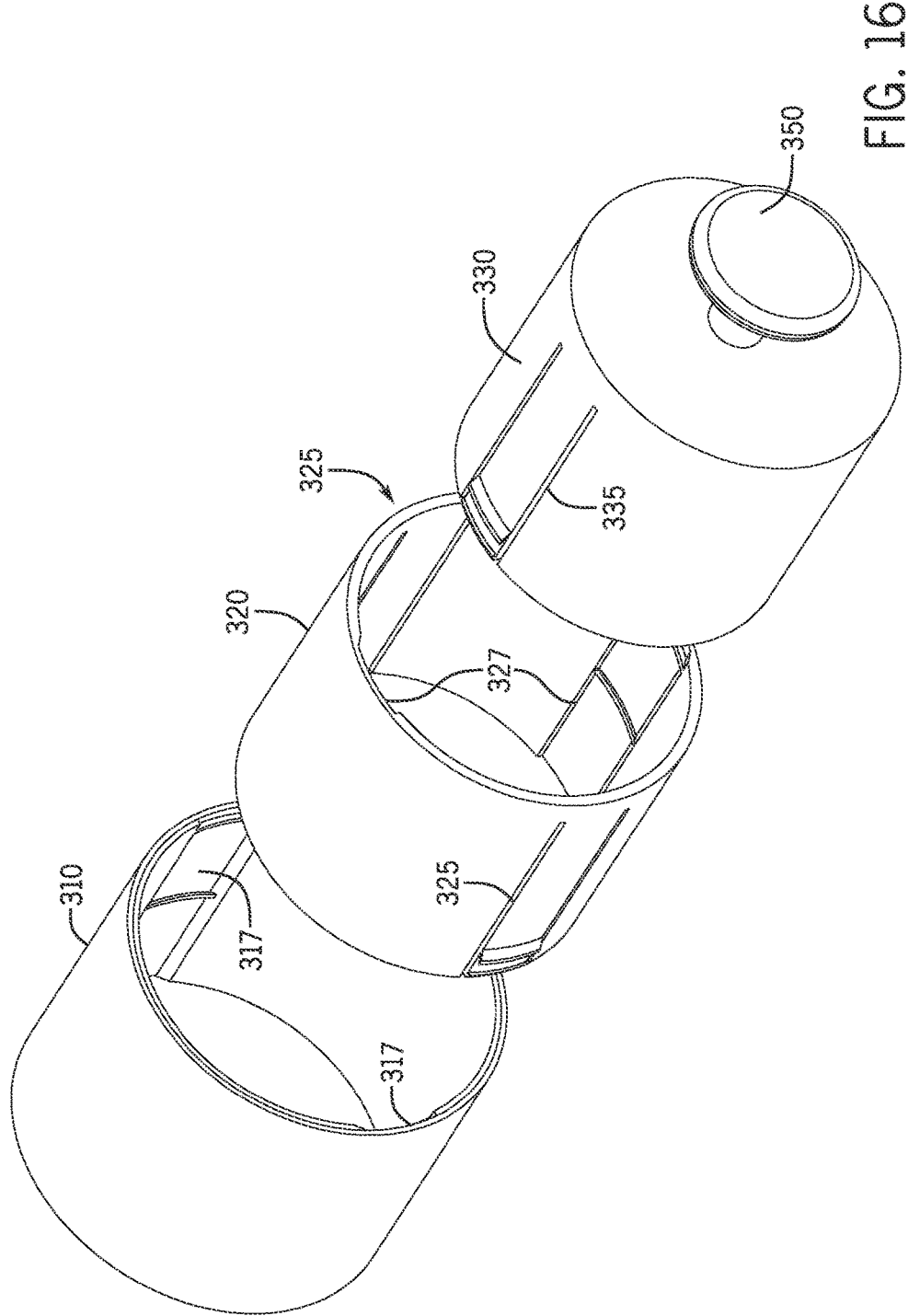
FIG. 16 shows an exploded view of the plurality of nesting drive pucks as viewed from above.

FIG. 16 shows an exploded view of the plurality of nesting drive pucks as viewed from above. Puck 310 incorporates retaining channels 317, which receive and retain locking tabs 325 piece 320. Similarly, piece 320 has retaining channels 327, which receive locking tabs 335 on piece 330. When locking tabs are placed within receiving channels as shown in FIG. 17, an extension of length approximating that of threaded shaft 160 is realized while providing a collapsible and storable drive mechanism for pressing piston 150 upward toward shoulder 120.

Figure 18:
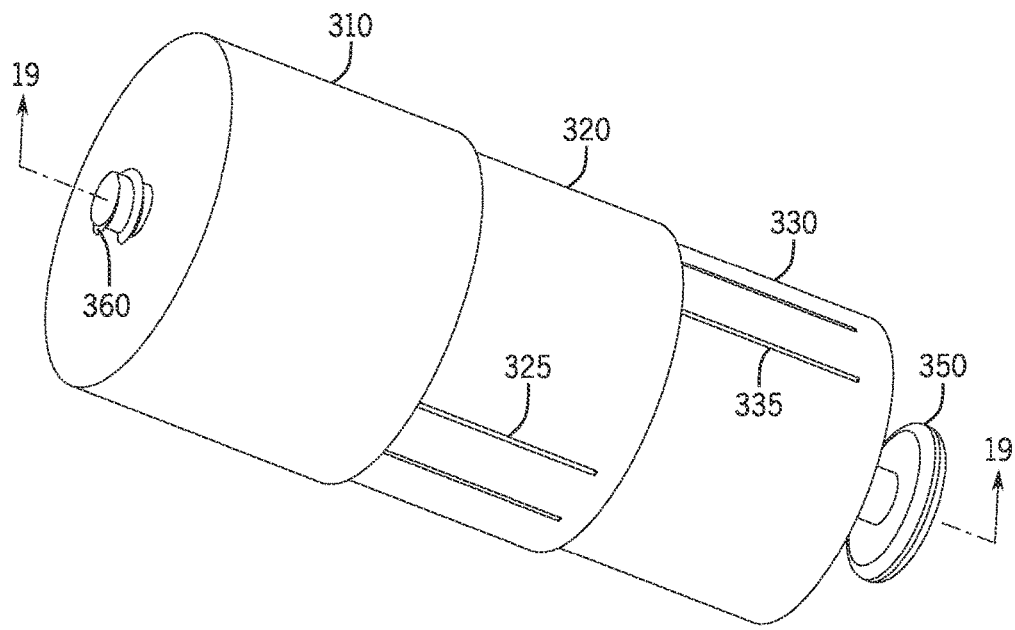
FIG. 18 shows an alternative embodiment of the nesting drive pucks having a threaded interface to engage the piston of the dispensing device of FIG. 1.

FIG. 18 shows an alternative embodiment of the nesting drive pucks having a threaded interface 360 to engage the bottom of piston 150 (removed for clarity). As shown in earlier FIGS. and described above with respect to threaded shaft 160, threaded shaft 160 has a threaded interface that terminates in the bottom of piston 150, which also incorporates a threaded interface to receive threaded shaft 160. Threaded interface 360 in FIG. 18 also attaches nesting drive pucks 300 to piston 150 in a similar manner.

Figure 17:
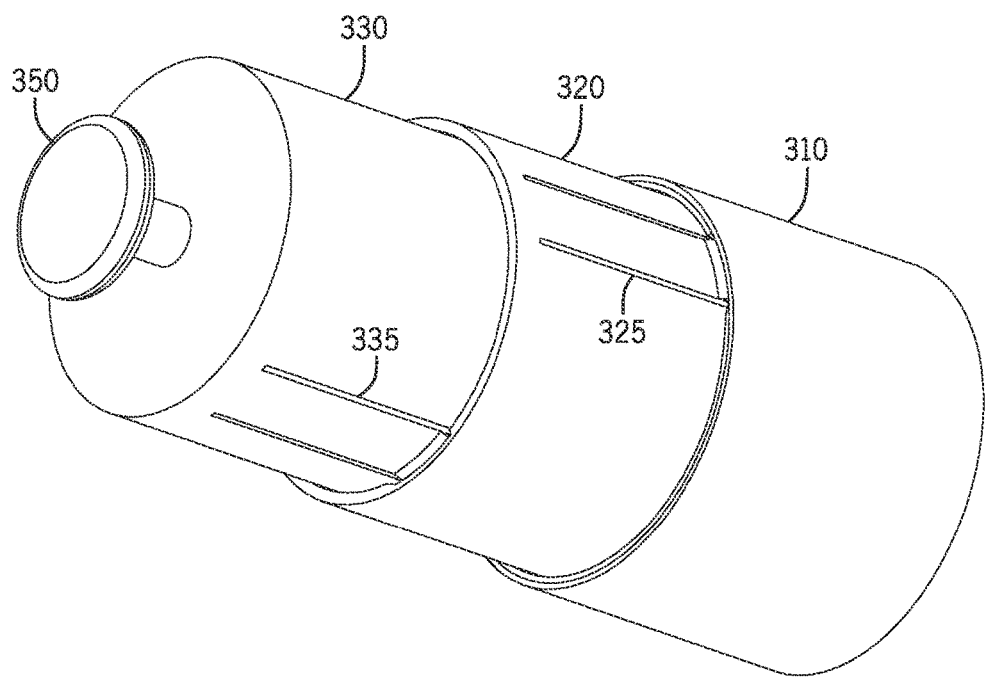
FIG. 17 shows a perspective view of plurality of nesting drive pucks of FIGS. 15 and 16 in an assembled configuration.
Figure 19:
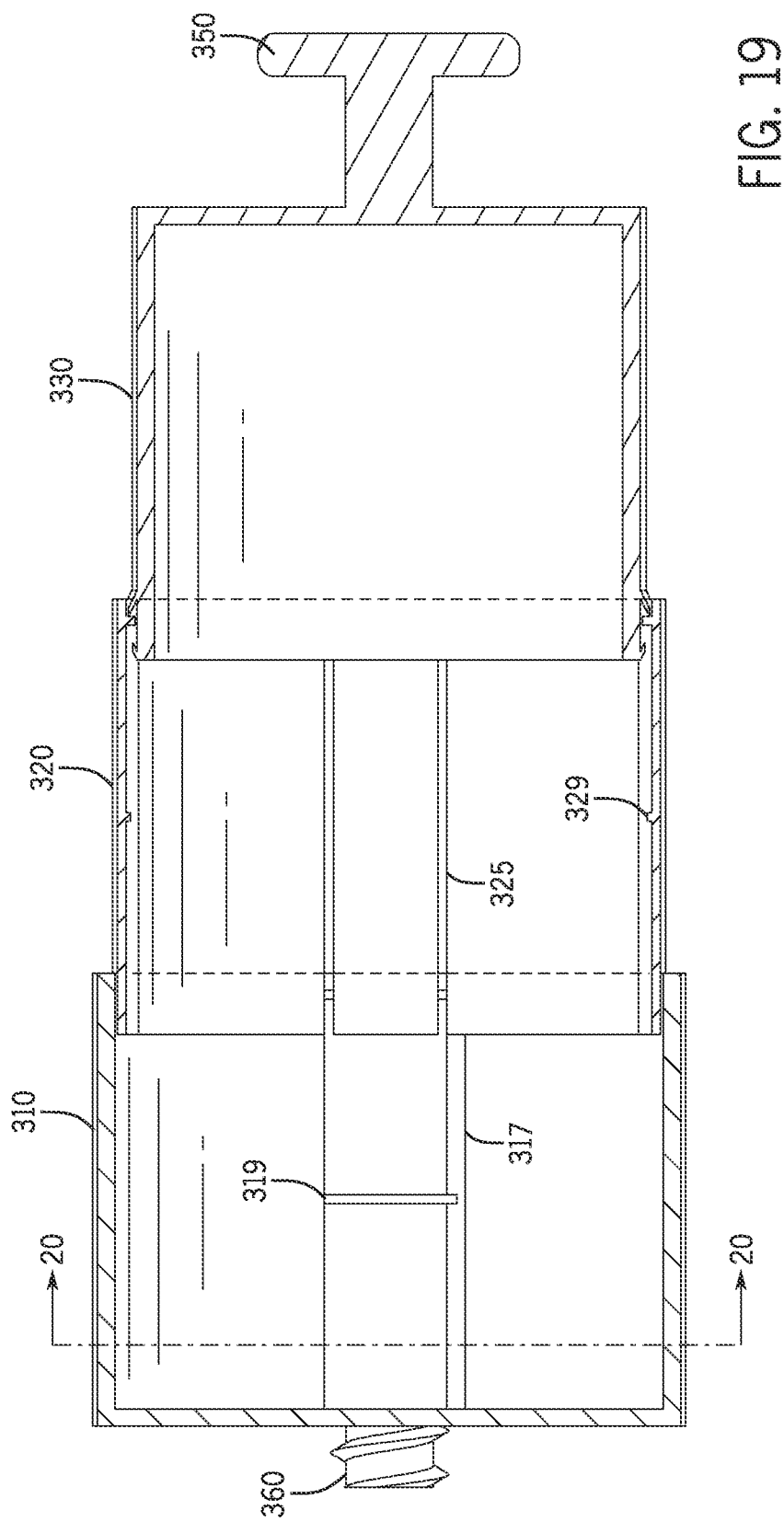
FIG. 19 shows a cutaway side view of the plurality of nesting drive pucks in an assembled configuration as shown in FIG. 17.

FIG. 19 shows a cutaway side view of the plurality of nesting drive pucks in an assembled configuration as shown in FIG. 17. As shown, receiving channel 317 incorporates a stop 319 at the deepest point on receiving channel 317; it is at this point where locking tab 325 is secured. Similarly, on piece 320, receiving channel 327 has stop 329, at which point locking tab 335 (not shown) is secured by piece 320.

Figure 20:
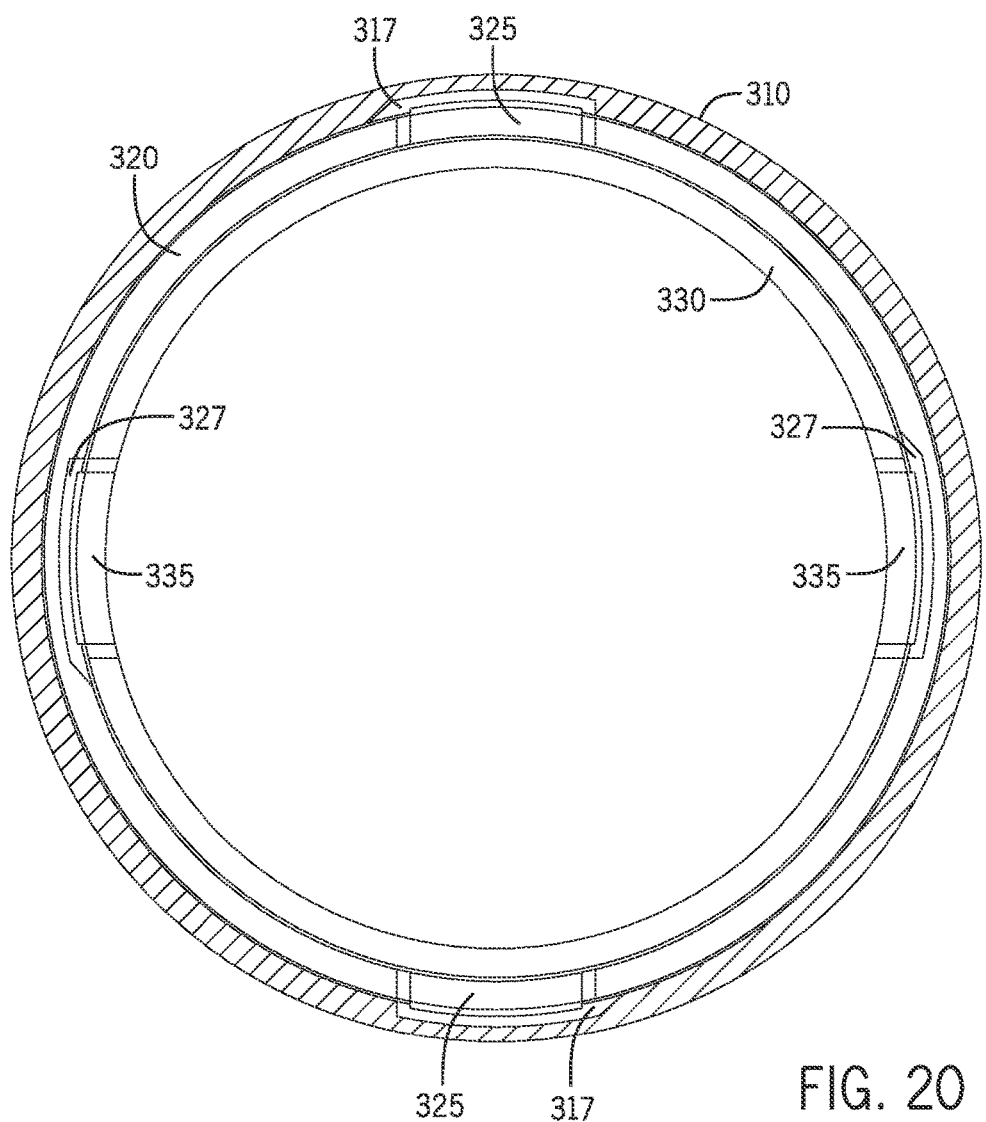
FIG. 20 shows the assembled plurality of drive pucks as seen from directly below.

FIG. 20 shows the assembled plurality of drive pucks as seen from directly below. Innermost piece 330 has locking tabs 335 inserted into receiving channels 327 on middle piece 320, which in turn has locking tabs 325 inserted into receiving channels 317 on outermost piece 310.

Figure 21:
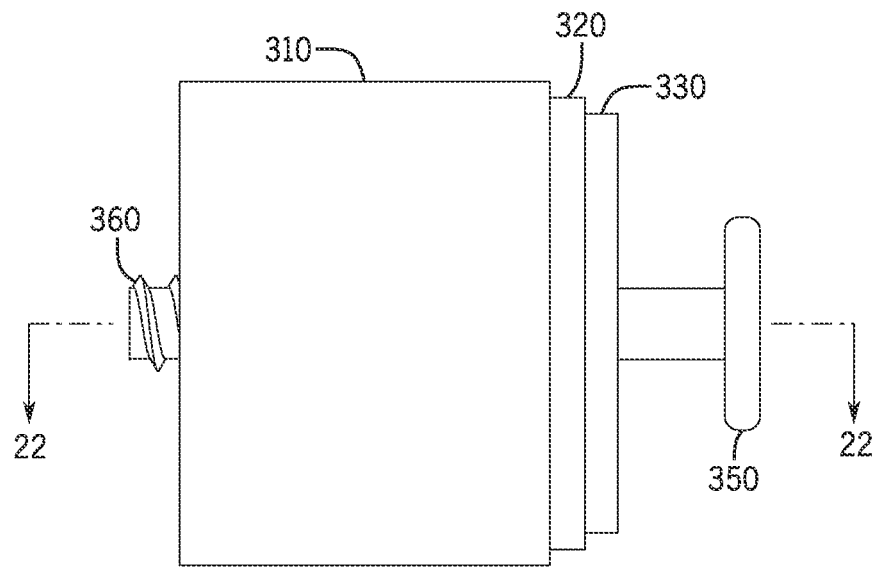
FIG. 21 shows a side view of the plurality of drive pucks in a nested configuration.

FIG. 21 shows a side view of the plurality of drive pucks in a nested configuration without locking tabs or receiving channels engaged. This is the storage position that nested pucks assumes when bottle body 140 is full and piston 150 is in its lowest position. Innermost piece 330 is connected to puck 350 and inserted into piece 320; piece 320 is inserted into outermost 310, which also is connected with threaded interface 360.

Figure 22:
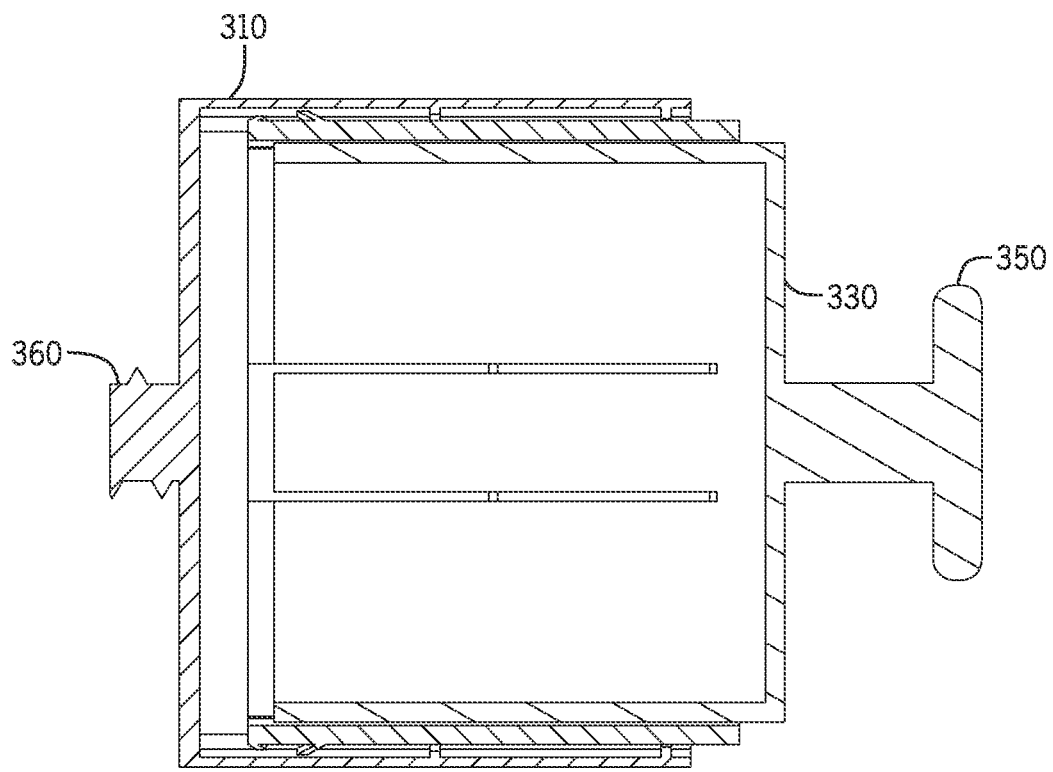
FIG. 22 shows a cutaway side view of FIG. 21 showing the nested configuration of drive pucks.

FIG. 22 shows a cutaway side view of FIG. 21 showing the nested configuration of drive pucks. As shown, threaded interface 360 is integral to piece 310, and puck 350 is integral to piece 330.

Figure 23:
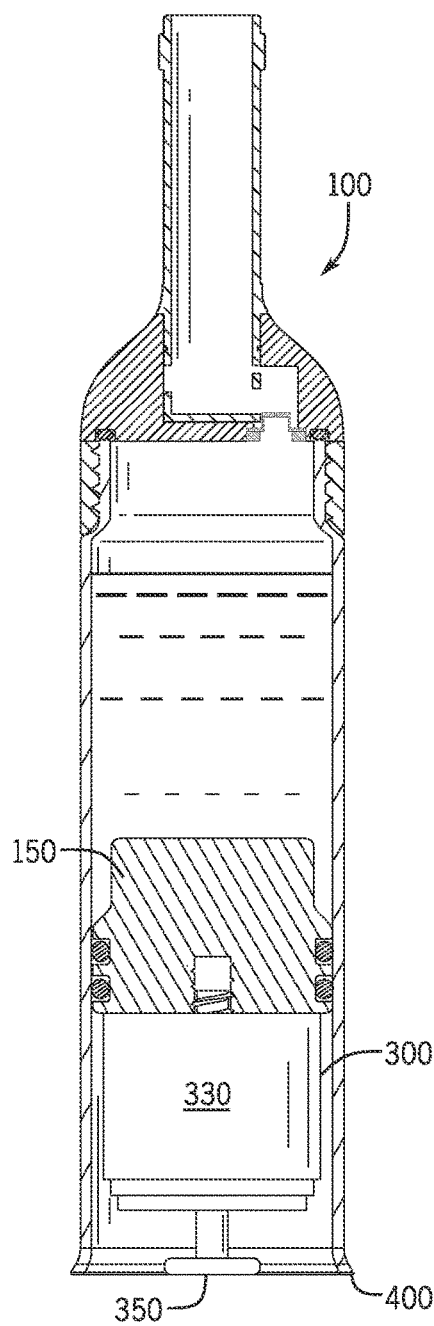
FIG. 23 shows a cutaway side view of the dispensing device of FIG. 1 with the nested configuration of drive pucks.
Figure 24:
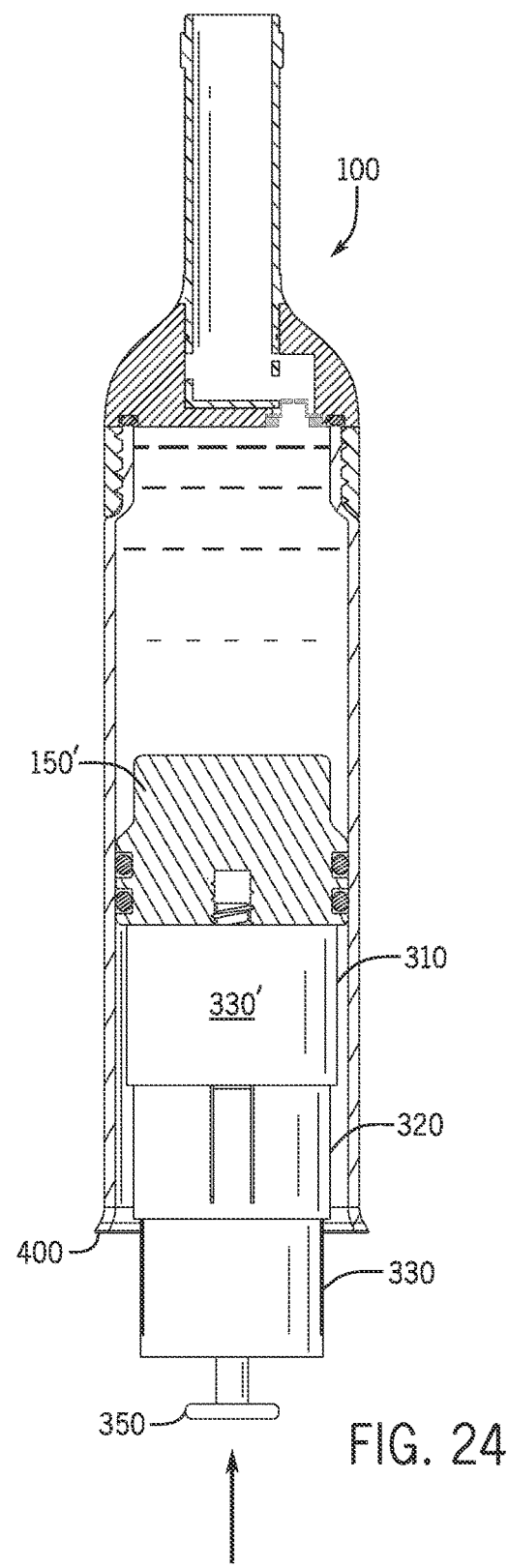
FIG. 24 shows a cutaway side view of the dispensing device shown in FIG. 23 with the pucks in an assembled configuration.

FIGS. 23 and 24 show a cutaway side view of the dispensing device 100 with the nested configuration of drive pucks 300 in stored configuration and extended for use, respectively.

As shown in FIG. 23, pucks 300 are nested within each other, and puck 350 is retained above the bottom edge 400 of dispensing device 100. As described above, this is the stored orientation of nesting drive pucks 300, useful in upright storage of dispensing device 100 when it is full and piston 150 is at its lowest position.

FIG. 24 shows dispensing device 100 after nesting drive pucks 300 are assembled into their locked position and puck 350 is extended farther away from piston 150. As shown in FIG. 24, both piece 310 and 320 are now above the bottom edge 400, and piston 150 has been driven upward with pressure exerted on puck 350.

Figure 25:
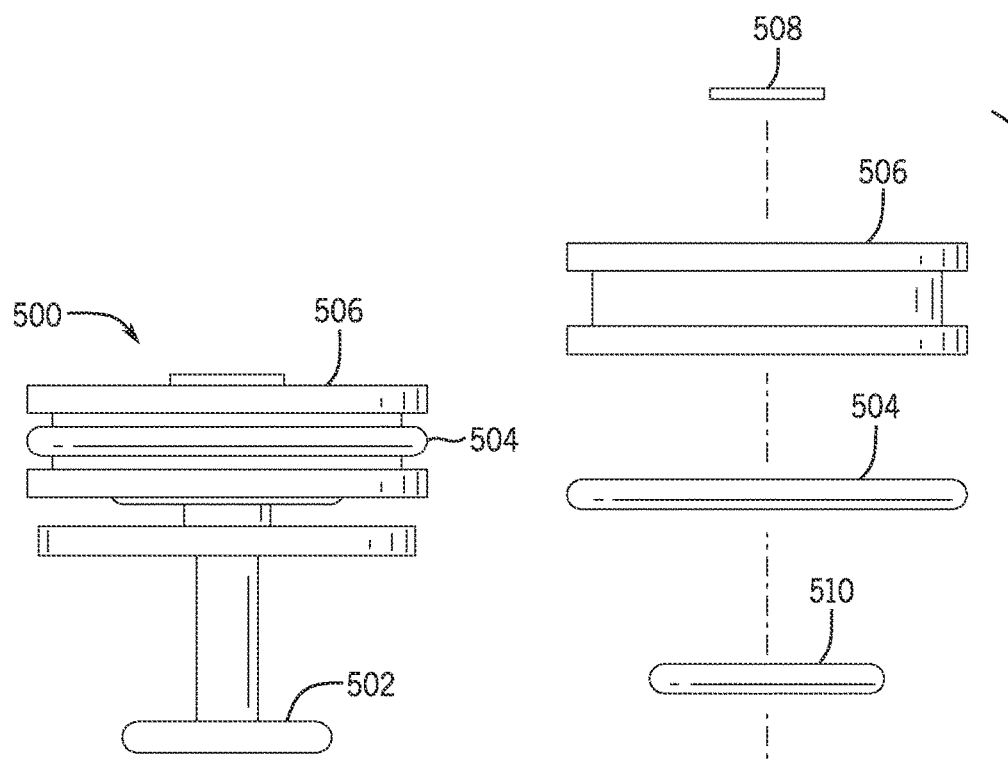
FIG. 25 shows a side view of an alternative embodiment of a pump used without a push rod or nesting drive pucks.
Figure 26:
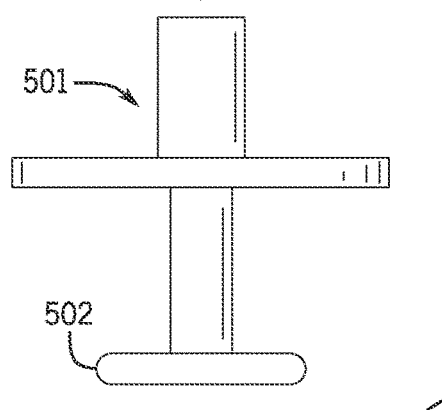
FIG. 26 shows an exploded view of the pump shown in FIG. 25.

FIG. 25 shows pump 500, an alternative embodiment to piston 150 described above. While piston 150 includes aperture 158 to receive threaded rod 160 or threaded interface 360 from nesting drive pucks 300, pump 500 presents a hand-driven pump that drives piston 150 upward in bottle body 140 in an embodiment. As shown in FIG. 26 grab handle 502, and O-ring 504 retained in channeled member 506, which is secured by fasteners 508 and 510 to central member 501. Similar to the design of O-rings 152 and 154, O-ring 504 provides a seal against the interior surface of bottle body 140 pump 500 is inserted into dispensing device 100.

Note that the operators hand can drive the piston forward also. A rod, a telescoping rod (multiple pucks), or a pump can be used once the piston is driven by hand as far as the operator is able to push.

The following sealing rings could be used instead of O-rings: V-rings, X-rings, U-rings, Square-Rings.

The following valves could also be used instead of the single slit or perpendicular slit valves: Duckbill Valve, Umbrella Valve, Cross Slit Valve, Dome Valve, Dispensing Valve, Valve Ball.

While a wine dispenser that protects wine quality has been described and illustrated in detail, it is to be understood that numerous modifications can be made to the embodiments of the present invention without departing from the spirit and scope of the invention as claimed.

What is claimed is:

1. A wine dispenser that protects wine quality by reducing oxidation of wine when the dispenser is partially full, the dispenser comprising:
   a bottle body capable of containing wine, the bottle body having a piston-receiving end and a wine dispensing end, the bottle body having a uniform cross section between the piston-receiving end and the wine dispensing end;
   a piston disposed within the piston-receiving end of the bottle body, the piston being capable of pushing the wine toward the wine dispensing end of the bottle body;
   a drive member cooperative with the piston, the drive member being capable of pushing the piston along the bottle body; and
   a dispensing assembly attached to the dispensing end of the bottle body, the dispensing assembly including:
      a shoulder sealed to the dispensing end of the bottle body, the shoulder having a wine flow channel therethrough, the wine being able to flow out from the bottle body only via the wine flow channel;
      a neck cooperative with the shoulder, the neck being in sealable and rotatable relationship with the shoulder, the neck having a pouring end and a flow regulation end, the flow regulation end having at least one opening that can be rotated so as to permit wine to flow in from the wine flow channel, through the at least one opening, and out through the pouring end of the neck, when pressure is applied to the piston via the drive member, the flow regulation end of the neck including an aerated pour opening, and a non-aerated pour opening.

2. The dispenser of claim 1, wherein flow regulation end of the neck can be rotated so as to prevent flow of wine from the dispenser.

3. The wine dispenser of claim 1, wherein the uniform cross section between the piston-receiving end and the wine dispensing end is one of:
   a circular shape, or an oval shape, or a rounded square shape.

4. The wine dispenser of claim 1, wherein the drive member is one of:
   a push rod, or a telescoping rod, or a pump.

5. The wine dispenser of claim 1, wherein:
   the drive member includes a handle and a threaded shaft, the threaded shaft being attached to a threaded hole in the piston.

6. The wine dispenser of claim 1, wherein:
   the piston includes first and second O-rings, the O-rings providing a seal between the bottle body and the piston.

7. The wine dispenser of claim 1, wherein:
   the bottle body includes fill marks indicating volumes of wine stored therein.

8. The wine dispenser of claim 1, wherein:
   the bottle body includes a temperature strip indicating surface temperature of the bottle body.

9. The wine dispenser of claim 1, the channel in the shoulder further comprising:
   a valve that is air-tight when pressure is the same on both sides, the valve also allowing wine to flow therethrough when under pressure from wine pushed towards it by the piston.

10. The dispenser of claim 9, wherein:
    the neck can be rotated so as to align the at least one opening with the valve so as to permit wine to flow through the wine flow channel, through the valve, through the at least one opening, and out through the pouring end of the neck so as to dispense the wine.

11. The wine dispenser of claim 9, wherein the valve is a diaphragm having at least one cut.

12. The wine dispenser of claim 9, wherein the valve is a diaphragm having a pair of perpendicular cuts.

13. The wine dispenser of claim 1, wherein the drive member includes:
    at least one drive puck cooperative with the piston, the at least one drive puck providing a surface against which force may be applied so as to drive the piston along the bottle body.

14. The wine dispenser of claim 13, further including:
    at least one additional drive puck that can cooperate with the at least one drive puck so as to form a plurality of interlocking drive pucks.

* * * * *